July 23, 1929.　　　G. H. HAINES　　　1,721,553

MIXING APPARATUS

Filed Dec. 21, 1928

INVENTOR
George H. Haines
By Archworth Martin,
　Attorney.

Patented July 23, 1929.

1,721,553

UNITED STATES PATENT OFFICE.

GEORGE H. HAINES, OF CALEDONIA, OHIO, ASSIGNOR TO THE GRAIN MACHINERY COMPANY, OF MARION, OHIO, A CORPORATION OF OHIO.

MIXING APPARATUS.

Application filed December 21, 1928. Serial No. 327,673.

My invention relates to mixing apparatus, and is more particularly designed for employment in the mixing of feed for live stock, but it is susceptible also of use in the mixing of other materials.

One object of my invention is to provide apparatus that will mix material more effectively than various types of devices heretofore employed.

Another object of my invention is to provide a mixing apparatus and feed device therefor of improved form.

Still another object of my invention is to simplify and improve generally the structure and operation of mixing apparatus.

Figure 1:
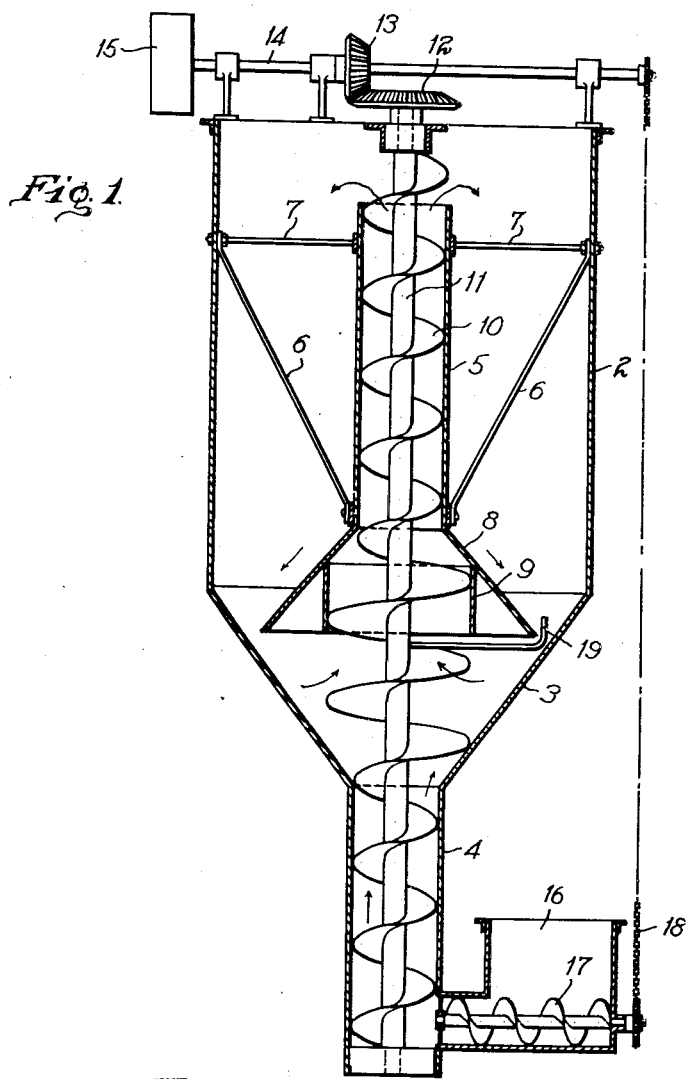
Figure 2:
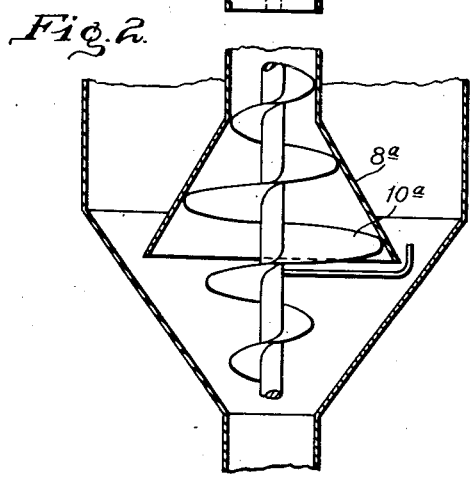

Some of the forms which my invention may take are shown in the accompanying drawing, where in Figure 1 is an elevational sectional view of one form of apparatus, and Fig. 2 is a modification thereof.

The mixing chamber proper is designated by the numeral 2 and is provided with a hopper-like bottom portion 3, and a cylindrical extension 4. A conduit 5 is supported in the chamber 2 by means of brace rods 6 and 7. This conduit 5 has a hood portion 8 of inverted conical form and a cylindrical portion 9 within the hood portion, the cylindrical portion 9 being of greater diameter than the upper cylindrical portion of the conduit.

A screw conveyer 10 is provided on a shaft 11, the upper portion of the conveyer 10 being of reduced diameter; the intermediate portion thereof being widened to approximately the interior diameter of the cylindrical portion 9 and the lower portion thereof fitting within the cylinder 4.

The shaft 11 carries a bevel gear 12 that is driven by a bevel gear 13 which is mounted upon a shaft 14 that carries a driving pulley 15.

The material to be mixed is applied to the chamber 2 from a hopper 16 that contains a screw conveyer 17 which is driven from the shaft 14 by means of a sprocket chain 18. Material fed from the hopper 16 into the lower end of the cylinder 4 is carried upwardly by the conveyer 10 and is discharged from the upper end of the conduit 5, as indicated by the arrows. The material so discharged falls upon the hood 8 and passes around the lower edge of said hood into the hopper 3 where it is again caught by the conveyer 10 and repassed through the conduit 5. This repeated passing of the material is continued until the various constituents thereof have been suitably mixed.

The material is discharged from the upper end of the conduit in a spray-like manner, and the mixing action is still further enhanced by the materials passing over the edge of the hood 8, which tends to break up all stratification of materials. A stirring rod 19 is carried by the shaft 11 to prevent clogging of the material between the edge of the hood 8 and the hopper 3.

An important feature of my invention resides in the hood 8 and in the enlargement of that portion of the conveyer 10 that lies within and extends below the cylindrical portion 9 of the conduit. This arrangement produces in effect a surcharge of material into the upper cylindrical portion of the conduit and in some cases will advance material upwardly, which would not be elevated by a screw which was of uniform diameter throughout its length, and furthermore it increases the efficiency of the apparatus under all circumstances.

If desired, the cylindrical portion 9 may be omitted, but in that case it would be desirable to still further enlarge that portion of the screw 10ª (Fig. 2) which is disposed within the hood 8ª, such enlargement being preferably of tapering form.

I claim as my invention:—

1. Mixing apparatus comprising a mixing chamber, a conveyer screw operating in said chamber, and a conduit surrounding said screw and open at its upper and lower ends, the lower portion of the conduit and the adjacent portion of the screw being of greater radial dimension than the upper portions of these parts.

2. Conveying apparatus comprising a vertically-disposed conduit, the upper portion of which is of reduced diameter relative to its lower portion, and a screw conveyer operating in said conduit, the upper portion of said conveyer being of reduced radial dimension relative to its lower portion.

3. Mixing apparatus comprising a vertically-disposed conduit, the upper portion of which is of reduced diameter relative to its lower portion, a screw conveyer operating in said conduit, the upper portion of said conveyer being of reduced radial dimension relative to its lower portion, and a hood-like member surrounding the lower portion of said conduit in position to deflect material discharged from the upper end of the said conduit.

4. Mixing apparatus comprising a vertically-disposed conduit, the upper portion of which is of reduced diameter relative to its lower portion, a screw conveyer operating in said conduit, the upper portion of said conveyer being of reduced radial dimension relative to its lower portion, a hood-like member surrounding the lower portion of said conduit in position to deflect material discharged from the upper end of said conduit, and a hopper disposed circumferentially of the said hood.

5. Mixing apparatus comprising a mixing chamber, a conduit vertically disposed within said chamber, a screw conveyer in said conduit, and a hood-like member disposed around said conduit adjacent to but above the lower end thereof in position to deflect material discharged from the upper end of the conduit.

6. Mixing apparatus comprising a mixing chamber, a conduit vertically disposed within said chamber, a screw conveyer in said conduit, a hood-like member disposed around said conveyer adjacent to the lower end thereof in position to deflect material discharged from the upper end of the conduit, and a stirring rod carried by said conveyer and extending into the space between the hood and the wall of the mixing chamber.

7. Mixing apparatus comprising a mixing chamber of hopper form adjacent to its lower end, a conduit disposed in the upper portion of said chamber, a screw conveyer disposed in said conduit, and a hood-like member disposed about said conduit adjacent to but above the lower end thereof and within the said hopper portion.

8. Conveying apparatus comprising a vertically-disposed conduit of cylindrical form throughout its upper portion, and of increased diameter at its lower portion, and a screw conveyer operating in said conduit, the lower portion of said conveyer being of greater diameter than the upper portion thereof.

9. Mixing apparatus comprising a casing, a vertically-disposed conduit within the casing, and a screw conveyer operating in the conduit to advance material upwardly therethrough, a portion of the conveyer extending from a point below the lower end of the conduit, and said portion being enlarged.

10. Mixing apparatus comprising a mixing chamber of hopper form adjacent to its lower end, a conduit disposed in said chamber and terminating at a point above the lower end of the hopper-like portion of the chamber, and a screw conveyer operating in said hopper and in said conduit, that portion of the conveyer which lies within the hopper being enlarged relative to the upper portion thereof.

11. Mixing apparatus comprising a mixing chamber of hopper form adjacent to its lower end, a conduit disposed in said chamber and terminating at a point above the lower end of the hopper-like portion of the chamber, and a screw conveyer operating in said hopper and in said conduit, that portion of the conveyer which lies within the hopper being enlarged relative to the upper portion thereof, and the lower portion of said conduit being of greater diameter than the upper portion thereof.

In testimony whereof I, the said GEORGE H. HAINES, have hereunto set my hand.

GEORGE H. HAINES.